United States Patent
Nishimura et al.

(10) Patent No.: US 11,804,753 B2
(45) Date of Patent: Oct. 31, 2023

(54) MOTOR AND MOTOR ASSEMBLY

(71) Applicant: Nidec Corporation, Kyoto (JP)

(72) Inventors: Hideki Nishimura, Kyoto (JP);
Tomohiro Hasegawa, Kyoto (JP);
Hiroaki Hirano, Kyoto (JP); Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 238 days.

(21) Appl. No.: 17/335,361

(22) Filed: Jun. 1, 2021

(65) Prior Publication Data
US 2021/0376693 A1 Dec. 2, 2021

(30) Foreign Application Priority Data
Jun. 2, 2020 (JP) ................ 2020-096424

(51) Int. Cl.
| H02K 5/173 | (2006.01) |
| H02K 7/116 | (2006.01) |
| H02K 21/22 | (2006.01) |
| H02K 7/08 | (2006.01) |
| F16H 1/16 | (2006.01) |
| F16H 55/22 | (2006.01) |

(52) U.S. Cl.
CPC ......... *H02K 7/1166* (2013.01); *H02K 5/1737* (2013.01); *H02K 7/088* (2013.01); *H02K 21/22* (2013.01); *F16H 1/16* (2013.01); *F16H 55/22* (2013.01)

(58) Field of Classification Search
CPC ......... F16H 1/16; F16H 55/22; H02K 7/1166; H02K 5/1737; H02K 7/088; H02K 21/22; H02K 5/00
See application file for complete search history.

(56) References Cited

U.S. PATENT DOCUMENTS

| | | | |
|---|---|---|---|
| 9,228,586 B2 * | 1/2016 | Afshari | F04C 29/0085 |
| 10,544,861 B2 * | 1/2020 | Afshari | F16H 61/468 |
| 10,660,405 B2 | 5/2020 | Schneider et al. | |
| 2008/0045374 A1 * | 2/2008 | Weinberg | B25J 9/102 623/24 |
| 2016/0053858 A1 * | 2/2016 | Brassitos | H02K 7/116 475/331 |
| 2016/0332696 A1 * | 11/2016 | Spaggiari | H02K 7/116 |
| 2017/0201154 A1 * | 7/2017 | Brassitos | B25J 9/102 |
| 2018/0283503 A1 * | 10/2018 | Georgiev | H02K 1/278 |
| 2019/0226478 A1 * | 7/2019 | Afshari | F04C 15/008 |

FOREIGN PATENT DOCUMENTS

JP 2005-168145 A 6/2005

* cited by examiner

*Primary Examiner* — Bobby Rushing, Jr.
(74) *Attorney, Agent, or Firm* — KEATING & BENNETT

(57) ABSTRACT

A motor includes a stator, a rotor, and a bearing. The stator includes a shaft that extends in a vertical direction. The rotor is rotatable around the shaft. The bearing supports the rotor in a rotatable manner. The rotor includes a magnet, a case, and a tooth groove. The magnet is radially outward of the stator and opposes the stator in a radial direction. The case covers a radially outer end of the magnet. The tooth groove is provided in a radially outer surface of the case.

20 Claims, 3 Drawing Sheets

MOTOR AND MOTOR ASSEMBLY

CROSS REFERENCE TO RELATED APPLICATION

The present application claims priority under 35 U.S.C. § 119 to Japanese Patent Application No. 2020-096424, filed on Jun. 2, 2020, the entire contents of which are hereby incorporated herein by reference.

1. Field of the Invention

The present disclosure relates to a motor and a motor assembly.

2. Background

Conventionally, a motor assembly that outputs a driving force of a motor to a gear that meshes with a pinion gear fixed to the output side of a shaft via the pinion gear has been known.

However, in the conventional motor assembly, the pinion gear is disposed outside a case of the motor assembly in the direction in which the shaft extends. Therefore, the size of the motor and the motor assembly having the pinion gear tends to increase in the direction in which the shaft extends. Therefore, the motor and the motor assembly may be increased in size.

SUMMARY

An example embodiment of a motor according to the present disclosure includes a stator, a rotor, and a bearing. The stator includes a shaft that extends in a vertical direction. The rotor is rotatable about the shaft. The bearing supports the rotor in a rotatable manner. The rotor includes a magnet, a case, and a tooth groove. The magnet is radially outward of the stator and opposes the stator in a radial direction. The case covers a radially outer end of the magnet. The tooth groove is provided in a radially outer surface of the case.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described below with reference to the drawings.

In the present specification, in a motor 101, a direction parallel to a central axis CA is referred to by the term "axial direction", "axial", or "axially". In the axial direction, a direction from a stator 1 to a bracket 4, which will be described later, is referred to by the term "lower" or "downward", and a direction from the bracket 4 to the stator 1 is referred to by the term "upper" or "upward". In each component, one end in the axial direction which is a lower side end is referred to as a "lower end", and the other end in the axial direction which is an upper side end is referred to as an "upper end". Further, regarding surfaces of each component, the surface facing downward is referred to as a "lower surface", and the surface facing upward is referred to as an "upper surface".

A direction orthogonal to the central axis CA is referred to by the term "radial direction", "radial", or "radially". In the radial direction, a direction toward the central axis CA is referred to by the term "radially inward", and a direction away from the central axis CA is referred to by the term "radially outward". In each component, a radially inward end is referred to as a "radially inner end", and a radially outward end is referred to as a "radially outer end". Further, regarding side surfaces of each component, the side surface directed radially inward is referred to as a "radially inner surface", and the side surface directed radially outward is referred to as a "radially outer surface".

A direction of rotation about the central axis CA is referred to by the term "circumferential direction", "circumferential", or "circumferentially".

In the positional relationship between any one of the azimuth, line, and plane and another one of them, the term "parallel" indicates not only a state in which they do not intersect at any point but also a state in which they are substantially parallel. The terms "vertical" and "orthogonal" indicate not only a state in which they intersect at 90 degrees with each other, but also a state in which they are substantially vertical and a state in which they are substantially orthogonal. That is, the terms "parallel", "vertical", and "orthogonal" each include a state in which the positional relationship between them has an angular deviation that does not depart from the gist of the present disclosure.

It should be noted that the matters described above are not strictly applied when incorporated in an actual device.

Figure 1:
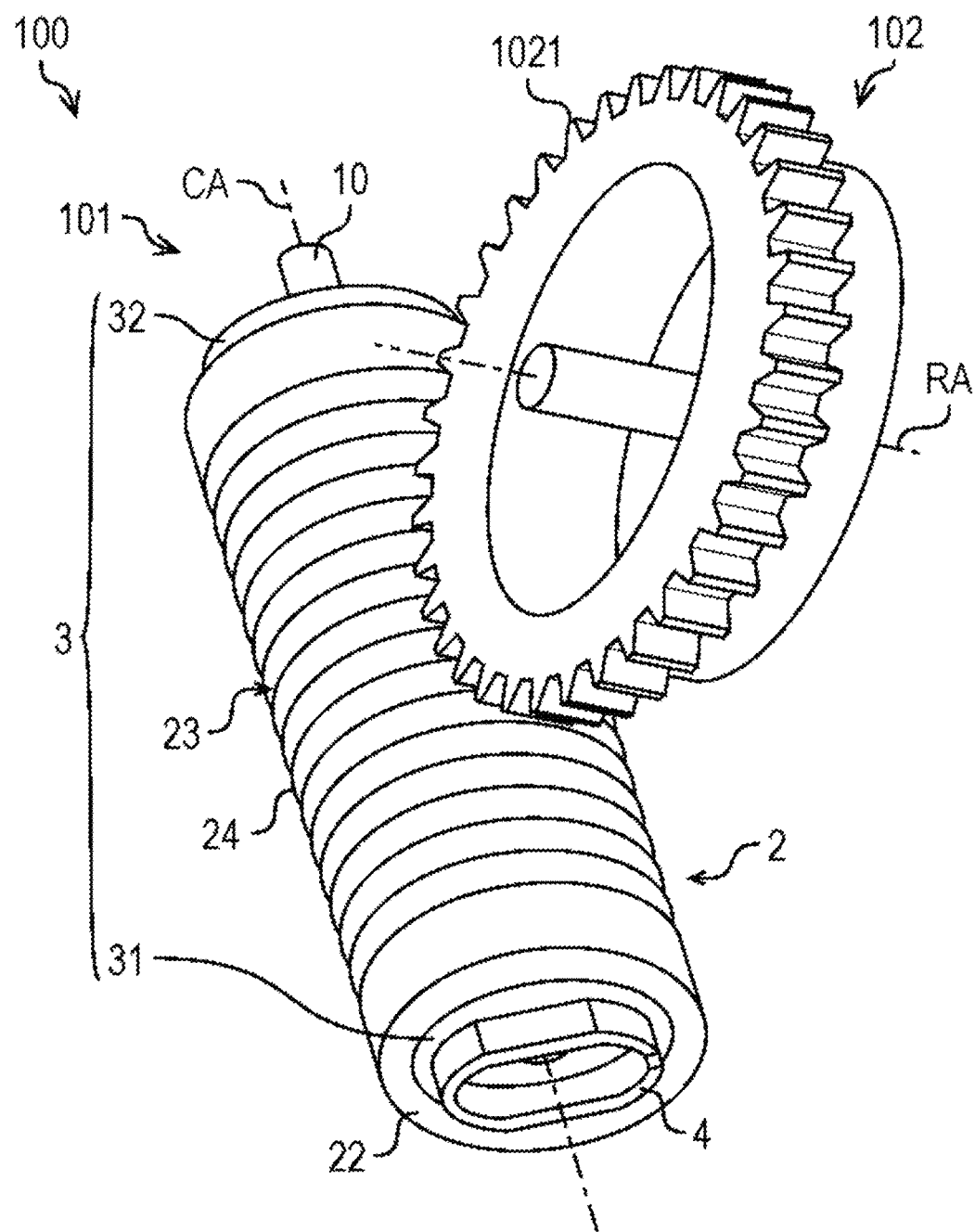
FIG. 1 is a perspective view showing a configuration example of a motor assembly according to an example embodiment of the present disclosure.

FIG. 1 is a perspective view showing a configuration example of a motor assembly 100. As shown in FIG. 1, the motor assembly 100 includes the motor 101 and a gear 102. The motor 101 is of an outer rotor type. As will be described later, a rotor 2 of the motor 101 has a case 22 formed with a tooth groove 23. The gear 102 is disposed outside the motor 101 and is rotatable about a rotation axis RA. The gear 102 has teeth 1021. The teeth 1021 mesh with the tooth groove 23 of the case 22. Thus, the rotational output of the motor 101 is transmitted to the gear 102. Therefore, it is not necessary to provide, for example, an output transmission gear on the outside of the case 22 of the motor assembly 100 in the axial direction. Accordingly, the size of the motor 101 in the axial direction can be reduced. Thus, the size of the motor 101 can be reduced.

As the material of the gear 102, resin, carbon steel, cast iron, stainless steel, brass, bronze, or the like can be used. Preferably, the material of the gear 102 is different from the material of the case 22. More specifically, the material of the teeth 1021 of the gear 102 is different from the material of the surface of the tooth groove 23 of the case 22. More preferably, a combination of materials that is likely to cause slide contact is used for the material of the teeth 1021 and the material of the surface of the tooth groove 23. In other words, a combination that is unlikely to generate an alloy is employed. For example, the higher the rotation speed of the motor 101 and the gear 102, the more likely the teeth 1021 seize on the surface of the tooth groove 23. Employing a combination of different kinds of materials can reduce a possibility of seizure, as compared to the case where a combination of same kinds of materials is employed. Furthermore, by employing a combination that is unlikely to generate an alloy, the possibility of seizure can be further reduced. Therefore, wear resistance of the surface of the tooth groove 23 and the teeth 1021 can be improved. A material having tensile strength necessary for maintaining the meshing structure of the teeth 1021 and the tooth groove 23 is selected as the material of each component. For example, a combination of carbon steel and bronze can be employed.

Figure 2:
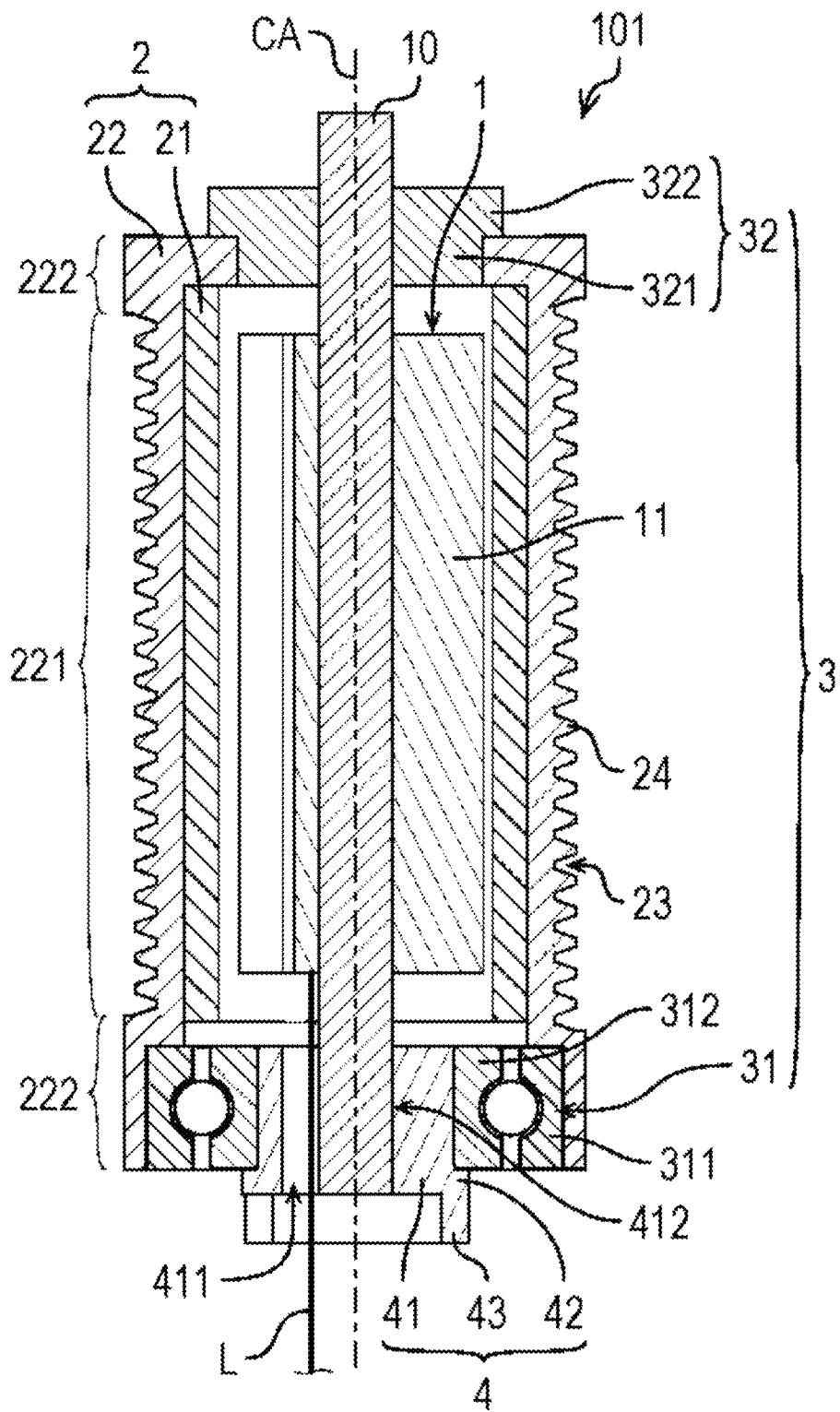
FIG. 2 is a sectional view showing a configuration example of a motor according to an example embodiment of the present disclosure.

Next, the configuration of the motor 101 will be described with reference to FIGS. 1 and 2. FIG. 2 is a sectional view showing a configuration example of the motor 101. Note that FIG. 2 shows the cross-sectional structure of the motor 101 when the motor 101 is cut on a virtual plane including the central axis CA. As shown in FIG. 2, the motor 101 includes a stator 1, a rotor 2, a bearing 3, and a bracket 4.

The stator 1 drives and rotates the rotor 2 by a magnetic flux generated when power is supplied. As described above, the motor 101 includes the stator 1. The stator 1 has a shaft 10 extending in the vertical direction. The shaft 10 is a fixed shaft of the stator 1 in the present example embodiment. Note that the present disclosure is not limited to the present example embodiment, and the shaft 10 may be rotatable together with the rotor 2 about the central axis CA. When the shaft 10 is rotatable, a bearing (not shown) is provided between the shaft 10 and the stator 1.

The stator 1 has a stator core 11 that is a magnetic body. The stator core 11 has a cylindrical shape surrounding the shaft 10 and is fixed to a radially outer surface of the shaft 10. A coil (not shown) is wound around the stator core 11 via an insulator (not shown) having electrical insulation.

The rotor 2 can rotate about the shaft 10. As described above, the motor 101 has the rotor 2. The rotor 2 has a magnet 21 and the case 22.

The magnet 21 is disposed radially outward of the stator 1 and faces the stator 1 in the radial direction. As mentioned above, the rotor 2 has the magnet 21. The magnet 21 has a plurality of magnetic poles that are different from each other, that is, N poles and S poles. The N poles and S poles are arranged alternately in the circumferential direction.

The case 22 has a cylindrical shape surrounding the central axis CA and extends in the axial direction. The case 22 is disposed radially outward of the magnet 21. As described above, the rotor 2 has the case 22. The case 22 covers a radially outer end of the magnet 21. In the present example embodiment, the magnet 21 is held on a radially inner end of the case 22. Further, a radially outer end of the bearing 3 is in contact with a radially inner end of the case 22 at both ends of the case 22 in the axial direction.

The case 22 is a magnetic body. With this configuration, it is possible to prevent the magnetic flux of the magnet 21 from leaking to the outside of the case 22 in the radial direction. Therefore, the magnetic force of the magnet 21 can be effectively utilized.

Preferably, the case 22 is made of a magnetic material having soft magnetism suitable for a yoke and mechanical strength suitable for a gear. Mechanical strength indicates, for example, tensile strength, elongation, drawing property, hardness, and the like. Tensile strength indicates the maximum strength with respect to the tensile force of the material. Elongation indicates an amount of deformation of the material with respect to a given tensile stress. Drawing property indicates the ease of elongation of the material in the thickness direction. Examples of usable magnetic materials mentioned above include austenite-ferritic stainless steel, ferritic stainless steel, and martensitic stainless steel.

In addition, it is preferable that the material of the case 22 is different from the material of the gear 102. More specifically, the material of the surface of the tooth groove 23 of the case 22 is different from the material of the teeth 1021 of the gear 102. With this configuration, the teeth 1021 can be prevented from being seized on the surface of the tooth groove 23 as described above. Therefore, the wear resistance of the surface of the tooth groove 23 can be improved.

The case 22 has the tooth groove 23. In other words, the rotor 2 has the tooth groove 23. The tooth groove 23 is formed in the radially outer surface of the case 22. With this configuration, the rotational output of the motor 101 can be transmitted to the gear 102 by, for example, engaging the teeth 1021 of the gear 102 provided outside the motor 101 with the tooth groove 23 of the case 22. Therefore, it is not necessary to provide, for example, an output transmission gear on the outside of the case 22 of the motor assembly 100 in the axial direction. Accordingly, the size of the motor 101 in the axial direction can be reduced. Thus, the size of the motor 101 can be reduced.

The tooth groove 23 extends at least in the axial direction. In the present example embodiment, the tooth groove 23 is spiral and extends clockwise in the circumferential direction from top to bottom. The shape of the tooth groove 23 is not limited to that of the present example embodiment. For example, the spiral tooth groove 23 may extend counterclockwise in the circumferential direction from top to bottom. Further, a plurality of tooth grooves 23 may be formed. Each tooth groove 23 may extend parallel to the central axis CA. Alternatively, each tooth groove 23 may extend in a direction diagonally intersecting the axial direction.

Teeth 24 protruding radially outward are formed between grooves of the tooth groove 23 on the radially outer surface of the case 22. More specifically, the teeth 24 are provided between the adjacent grooves of the tooth groove 23 in the direction in which the tooth groove 23 extends and in the direction orthogonal to the radial direction. In the present example embodiment, the teeth 24 are provided between the adjacent grooves of the tooth groove 23 in the axial direction. The teeth 24 extend in the same manner as the tooth groove 23 and mesh with the teeth 1021 of the gear 102 disposed outside the motor 101.

Preferably, as shown in FIGS. 1 and 2, the lower end of the tooth groove 23 is separated upward from the lower end of the case 22. Further, the lower end of the teeth 24 is separated upward from the lower end of the case 22. With this configuration, it is possible to prevent the tooth groove 23 and the tooth 1021 of the gear 102 which are engaged with each other at the lower end of the case 22 from moving downward beyond the lower end of the case 22 and being disengaged from each other.

Preferably, the upper end of the tooth groove 23 is separated downward from the upper end of the case 22 as shown in FIGS. 1 and 2. Further, the upper end of the teeth 24 is separated downward from the upper end of the case 22. With this configuration, it is possible to prevent the tooth groove 23 and the tooth 1021 of the gear 102 which are engaged with each other at the upper end of the case 22 from moving upward beyond the upper end of the case 22 and being disengaged from each other.

More preferably, the tooth groove 23 is formed in the central side of the case 22 in the axial direction with respect to the bearing 3 as shown in FIGS. 1 and 2. Further, the teeth 24 are provided on the central side of the case 22 in the axial direction with respect to the bearing 3. The tooth groove 23 is not formed in a region of the case 22 overlapping the bearing 3 as viewed in the radial direction, whereby it is possible to prevent the thickness in the radial direction of the case 22 in this region from being reduced. Therefore, the strength of the case 22 in this region can be ensured.

More preferably, both ends of the tooth groove 23 in the axial direction are separated from ends of the case 22 in the axial direction as shown in FIGS. 1 and 2. Further, both ends of the teeth 24 in the axial direction are separated from the ends of the case 22 in the axial direction. In the following, a region of the case 22 in which the tooth groove 23 is formed in the radially outer surface is referred to as a "first region 221", and a region of the case 22 on the end side in the axial direction with respect to the first region 221 is referred to as a "second region 222". The case 22 has the first region 221 and the second region 222. In FIG. 2, the first region 221 is a region of the case 22 sandwiched between two second regions 222 in the axial direction. The lower second region 222 is a region of the case 22 below the first region 221. The upper second region 222 is a region of the case 22 above the first region 221. The first region 221 includes the tooth groove 23 and the teeth 24. That is, the tooth groove 23 and the teeth 24 are provided on the radially outer surface of the first region 221. On the other hand, the second regions 222 do not include the tooth groove 23 and the teeth 24. That is, the tooth groove 23 and the teeth 24 are not provided on the radially outer surface of the second regions 222.

Preferably, radially outer ends of the second regions 222 are located radially outward of the radially outer end of the first region 221 as shown in FIG. 2. With this configuration, it is possible to prevent the thickness of the second regions 222 in the radial direction from being reduced due to an increase in size of the bearing 3 in the radial direction. In particular, it is possible to prevent a portion of the second region 222 that overlaps with the bearing from being further reduced when viewed in the radial direction. Therefore, the strength of the second region 222 can be ensured.

However, the present disclosure is not limited to the example of FIG. 2, and either end of the tooth groove 23 in the axial direction may be separated from the end of the case 22 in the axial direction. For example, the lower end of the tooth groove 23 may be separated upward from the lower end of the case 22, while the upper end of the tooth groove 23 may reach the upper end of the case 22. Similarly, the lower end of the teeth 24 may be separated upward from the lower end of the case 22, while the upper end of the teeth 24 may reach the upper end of the case 22. Alternatively, the lower end of the tooth groove 23 may reach the lower end of the case 22, while the upper end of the tooth groove 23 may be separated downward from the upper end of the case 22. Similarly, the lower end of the teeth 24 may reach the lower end of the case 22, while the upper end of the teeth 24 may be separated downward from the upper end of the case 22.

The bearing 3 rotatably supports the rotor 2. As described above, the motor 101 has the bearing 3. In the present example embodiment, a plurality of bearings 3 is provided. In at least one of the bearings 3, a portion of the radially outer end of the bearing 3 that overlaps with the second region 222 when viewed in the radial direction is located radially outward of the radially inner end of the case 22 in the first region 221. For example, in FIG. 2, the radially outer end of a first bearing 31 overlaps the lower second region 222 when viewed in the radial direction, and is located radially outward of the radially inner end of the case 22 in the first region 221. In FIG. 2, a portion of the radially outer end of a second bearing 32 overlapping the upper second region 222 when viewed in the radial direction is located radially inward of the radially inner end of the case 22 in the first region 221. However, the present disclosure is not limited to the example of FIG. 2, and a portion of the radially outer end of the second bearing 32 overlapping the upper second region 222 when viewed in the radial direction may be located radially outward of the radially inner end of the case 22 in the first region 221. With this configuration, the size of at least one bearing 3 in the radial direction can be increased without significantly increasing the size of the case 22 in the radial direction. Therefore, the durability of at least one bearing 3 can be improved with respect to a load transmitted to the motor 101 from the gear 102 which has the teeth 1021 engaged with the tooth groove 23.

As shown in FIG. 2, the bearing 3 includes the first bearing 31 and the second bearing 32. The first bearing 31 rotatably supports the lower end of the rotor 2. The second bearing 32 rotatably supports the upper end of the rotor 2. In the present example embodiment, the first bearing 31 is disposed at the lower end of the motor 101, and the second bearing 32 is disposed at the upper end of the motor 101.

In the present example embodiment, the first bearing 31 is a ball bearing, and the second bearing 32 is a slide bearing. However, the present disclosure is not limited to this example, and the first bearing 31 may be another type of bearing such as a slide bearing. Further, the second bearing 32 may be another type of bearing other than the slide bearing, and may be, for example, a ball bearing. Preferably, at least one of the first bearing 31 and the second bearing 32 may be a ball bearing. The size of ball bearings in the radial direction is likely to be larger than that of slide bearings. On the other hand, the durability of ball bearings against axial loads is higher than that of slide bearings. Therefore, by employing a ball bearing, it is possible to improve the durability against both the axial load and the radial load transmitted from the gear 102 (see FIG. 1) which has the teeth 1021 engaged with the tooth groove 23.

The radially outer end of the first bearing 31 is in contact with the radially inner end at the lower end of the case 22. The radially inner end of the first bearing 31 is in contact with the radially outer end of the bracket 4. For example, in the present example embodiment, the first bearing 31, which is a ball bearing, has an outer ring 311 and an inner ring 312. The outer ring 311 is disposed on the radially outer end of the first bearing 31 and fixed to the radially inner end at the lower end of the case 22. The inner ring 312 is disposed on the radially inner end of the first bearing 31 and fixed to the radially outer end of the bracket 4.

The first bearing 31 has a first flat surface 3120 (see FIG. 3 described later). The first flat surface 3120 is provided at the radially inner end of the first bearing 31. The first flat surface 3120 is a flat surface parallel to the axial direction. In the present example embodiment, the two first flat surfaces 3120 are formed at the radially inner end of the inner ring 312 of the first bearing 31 so as to be equally spaced in the circumferential direction. The present disclosure is not limited to this example, and the number of the first flat surfaces 3120 may be one, or three or more. The first flat surfaces 3120 may be arranged at different intervals in the circumferential direction.

The radially outer end of the second bearing 32 is in contact with the upper end of the case 22. The radially inner end of the second bearing 32 is in contact with the radially outer surface of the shaft 10. In the present example embodiment, the second bearing 32 has a cylindrical part 321 and a flange 322. The cylindrical part 321 has a cylindrical shape surrounding the shaft 10 and extends in the axial direction. In the present example embodiment, a radially inner end of the cylindrical part 321 is fixed to the shaft 10. A lower end of the cylindrical part 321 at the radially outer end is in sliding contact with the radially inner end at the upper end of the case 22. The flange 322 extends radially outward from the radially outer end at the upper end of the cylindrical part 321. A lower end of the flange 322 faces the upper end of the case 22 in the axial direction. When the case 22 moves upward, the lower end of the flange 322 abuts on the upper end of the case 22. As a result, the upward movement of the case 22 can be restricted.

The present disclosure is not limited to the abovementioned example, and the radially inner end of the cylindrical part 321 may be in sliding contact with the shaft 10. Further, at least either the lower end of the cylindrical part 321 at the radially outer end or the lower end of the flange 322 may be fixed to the upper end of the case 22.

Further, an annular hub surrounding the shaft 10 may be provided between the radially inner end of the second bearing 32 and the shaft 10. With this configuration, the size of the radially inner end of the second bearing 32 in the radial direction can be increased. Therefore, for example, it becomes easy to use a ball bearing for the second bearing 32.

Next, the configuration of the bracket 4 will be described with reference to FIGS. 2 and 3. FIG. 3 is a bottom view showing the configuration of the lower end of the motor 101.

The bracket 4 is attached to the lower end of the shaft 10. As described above, the motor 101 has the bracket 4. The bracket 4 has an annular shape that surrounds the shaft 10. A radially inner end of the bracket 4 is fixed to the lower end of the shaft 10. A radially outer end of the bracket 4 is connected to the lower end of the case 22 via the first bearing 31. That is, the first bearing 31 is disposed between the lower end of the rotor 2 and the bracket 4.

The bracket 4 has a bracket cylindrical part 41, a bracket flange 42, and a wall 43. The bracket cylindrical part 41 has an annular shape that surrounds the shaft 10, and is attached to the lower end of the shaft 10. The bracket flange 42 extends radially outward from the lower end of the bracket cylindrical part 41. The upper end of the bracket flange 42 faces the radially inner end of the first bearing 31 in the axial direction. The wall 43 protrudes downward from the radially outer end of the bracket flange 42, and extends in the circumferential direction.

The bracket 4 has a hole 411. The hole 411 passes through the bracket 4 in the axial direction. More specifically, the hole 411 is formed in the bracket cylindrical part 41 and passes through the bracket cylindrical part 41 in the axial direction. In the present example embodiment, the three holes 411 are formed at equal intervals in the circumferential direction. However, the number of holes 411 is not limited to the number in the example of the present example embodiment, and may be one or two or more except for three. Further, the plurality of holes 411 may be arranged at different intervals in the circumferential direction.

Figure 3:
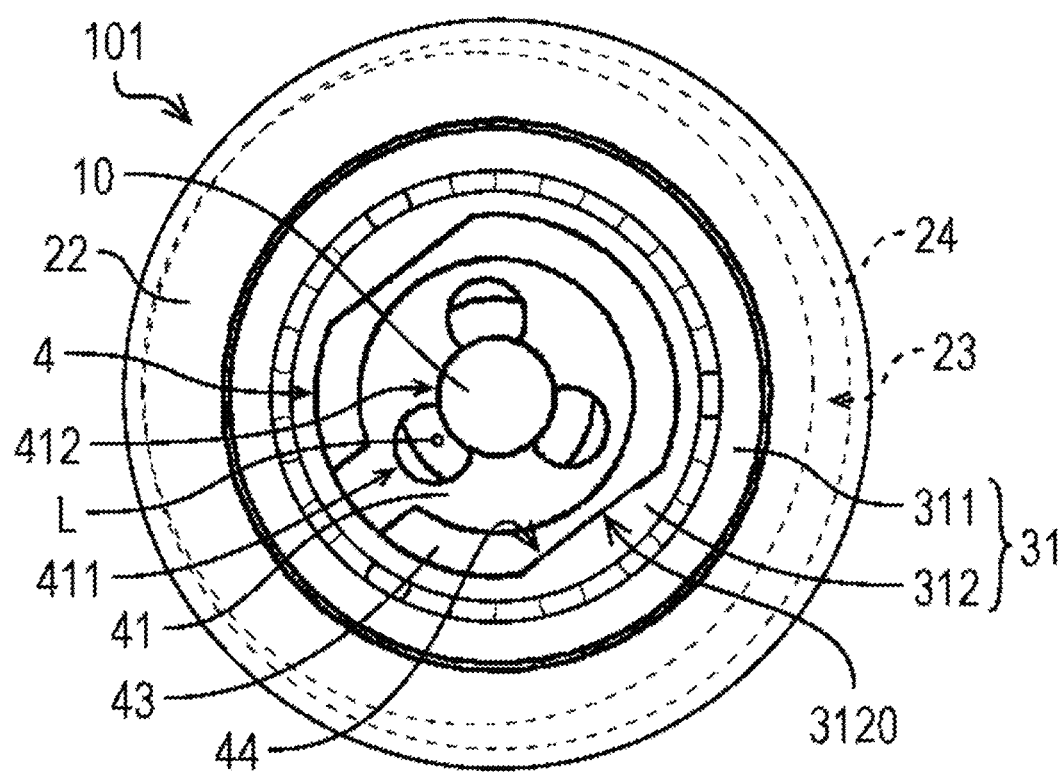
FIG. 3 is a bottom view showing a configuration example of a lower end of the motor according to an example embodiment of the present disclosure.

As shown in FIGS. 2 and 3, a connection line L connected to the stator 1 is extracted to the outside of the motor 101 through the hole 411. Specifically, the connection line L is extracted to the outside of the motor 101 through at least one of the holes 411. With this configuration, the size of the first bearing 31 in the radial direction can be further increased, so that a bearing having higher durability against a load can be employed for the first bearing 31. Further, the ball bearing having a large size in the radial direction can be arranged at the lower end of the motor 101, and the hole 411 through which the connection line L passes can be arranged radially inward of the ball bearing. Since ball bearings have high durability against axial loads, the durability of the motor 101 on one end in the axial direction can be improved, and the connection line L connecting the stator 1 and the outside of the motor 101 can be easily extracted.

The holes 411 are open on the radially inner surface of the bracket cylindrical part 41 and face the radially outer surface of the shaft 10. That is, a part of the radially outer surface of the shaft 10 is exposed to the holes 411. With this configuration, an opening 412 of the bracket cylindrical part 41 into which the shaft 10 is inserted leads to the holes 411, whereby the opening 412 and the holes 411 can be formed in the bracket 4 with the same processing step. Therefore, processing to form the holes 411 in the bracket 4 is facilitated. On the other hand, in a case where, for example, the opening 412 into which the shaft 10 is inserted and the holes 411 are formed at positions separated from each other in the bracket 4, it is necessary to form the opening 412 and the holes 411 in different steps.

Further, the bracket 4 has a second flat surface 44. The second flat surface 44 is provided at the radially outer end of the bracket 4. More specifically, the second flat surface 44 is provided on at least the radially outer end of the bracket cylindrical part 41. The second flat surface 44 is a flat surface parallel to the axial direction. The same numbers of second flat surfaces 44 as the first flat surfaces 3120 are formed at the radially outer end of the bracket cylindrical part 41. In the present example embodiment, the plurality of second flat surfaces 44 is arranged at equal intervals in the circumferential direction. The present disclosure is not limited to this example, and the plurality of second flat surfaces 44 may be arranged at different intervals in the circumferential direction.

The second flat surfaces 44 are in contact with the first flat surface 3120. With this configuration, it is possible to prevent the radially inner end (for example, the inner ring 312) of the first bearing 31 from moving in the circumferential direction with respect to the bracket 4.

The example embodiment of the present disclosure has been described above. Note that the scope of the present disclosure is not limited to the above example embodiment. The present disclosure can be implemented by making various modifications to the abovementioned example embodiment without departing from the gist of the present disclosure. In addition, the matters described in the above example embodiment can be arbitrarily combined together, as appropriate, as long as there is no inconsistency.

The present disclosure is useful, for example, in a device that transmits the output of a motor to a gear located outside the motor.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
a stator that includes a shaft extending in a vertical direction;
a rotor that is rotatable around the shaft; and
a bearing that supports the rotor in a rotatable manner; wherein
the rotor includes:
a magnet that is radially outward of the stator and that opposes the stator in a radial direction;
a case that covers a radially outer end of the magnet; and
a tooth groove that is provided in a radially outer surface of the case;
radial inner ends of the case at two ends in an axial direction are in contact with a radially outer end of the bearing; and
the tooth groove is at a central side of the case in the axial direction with respect to the bearing.

2. The motor according to claim 1, wherein
the tooth groove extends in at least an axial direction; and
an axial end of the tooth groove is separated toward a first axial end of the case from a second axial end of the case.

3. The motor according to claim 2, wherein
a first axial end of the tooth groove is separated toward the second axial end of the case from the first axial end of the case.

4. The motor according to claim 1, wherein
the case includes:
a first region in which the tooth groove is in the radially outer surface; and
a second region on an end side of the case in the axial direction with respect to the first region in the axial direction;
the motor includes a plurality of the bearings, and
in at least one of the plurality of the bearings, a portion of a radially outer end of the at least one of the plurality of the bearings overlapping the second region as viewed in the radial direction is located radially outward of the radially inner end of the case in the first region.

5. The motor according to claim 4, wherein
a radially outer end of the second region is located radially outward of a radially outer end of the first region.

6. The motor according to claim 1, wherein
the bearing includes:
a first bearing that rotatably supports an axial end of the rotor; and
a second bearing that rotatably supports another axial other end of the rotor; and
at least one of the first bearing and the second bearing is a ball bearing.

7. The motor according to claim 6, wherein
the stator includes a bracket that is attached to an axial end of the shaft;
the first bearing is provided between the axial end of the rotor and the bracket;
the bracket includes a hole that passes through the bracket in the axial direction; and
a connection line connected to the stator extends to an outside of the motor through the hole.

8. The motor according to claim 7, wherein
a portion of a radially outer surface of the shaft is exposed to the hole.

9. The motor according to claim 7, wherein
the first bearing includes a first flat surface at a radially inner end of the first bearing;
the bracket includes a second flat surface at a radially outer end of the bracket; and
the second flat surface contacts the first flat surface.

10. A motor assembly comprising:
the motor according to claim 1; and
a gear that includes a tooth which meshes with the tooth groove of the case.

11. A motor, comprising:
a stator that includes a shaft extending in a vertical direction;
a rotor that is rotatable around the shaft; and
a bearing that supports the rotor in a rotatable manner; wherein
the rotor includes:
a magnet that is radially outward of the stator and that opposes the stator in a radial direction;
a case that covers a radially outer end of the magnet; and
a tooth groove that is provided in a radially outer surface of the case;
the case includes:
a first region in which the tooth groove is in the radially outer surface; and
a second region on an end side of the case in the axial direction with respect to the first region in the axial direction;
the motor includes a plurality of the bearings, and in at least one of the plurality of the bearings, a portion of a radially outer end of the at least one of the plurality of the bearings overlapping the second region as viewed in the radial direction is located radially outward of the radially inner end of the case in the first region; and
a radially outer end of the second region is located radially outward of a radially outer end of the first region.

12. The motor according to claim 11, wherein
the tooth groove extends in at least an axial direction; and
an axial end of the tooth groove is separated toward a first axial end of the case from a second axial end of the case.

13. The motor according to claim 12, wherein
a first axial end of the tooth groove is separated toward the second axial end of the case from the first axial end of the case.

14. The motor according to claim 11, wherein
the bearing includes:
a first bearing that rotatably supports an axial end of the rotor; and
a second bearing that rotatably supports another axial other end of the rotor; and
at least one of the first bearing and the second bearing is a ball bearing.

15. The motor according to claim 14, wherein
the stator includes a bracket that is attached to an axial end of the shaft;
the first bearing is provided between the axial end of the rotor and the bracket;
the bracket includes a hole that passes through the bracket in the axial direction; and
a connection line connected to the stator extends to an outside of the motor through the hole.

16. The motor according to claim 15, wherein
a portion of a radially outer surface of the shaft is exposed to the hole.

17. The motor according to claim 15, wherein
the first bearing includes a first flat surface at a radially inner end of the first bearing;
the bracket includes a second flat surface at a radially outer end of the bracket; and
the second flat surface contacts the first flat surface.

18. A motor assembly comprising:
the motor according to claim 11; and
a gear that includes a tooth which meshes with the tooth groove of the case.

19. A motor, comprising:
a stator that includes a shaft extending in a vertical direction; a rotor that is rotatable around the shaft; and
a bearing that supports the rotor in a rotatable manner; wherein
the rotor includes:
   a magnet that is radially outward of the stator and that opposes the stator in a radial direction;
   a case that covers a radially outer end of the magnet; and
   a tooth groove that is provided in a radially outer surface of the case;
the bearing includes:
   a first bearing that rotatably supports an axial end of the rotor; and
   a second bearing that rotatably supports another axial other end of the rotor;
at least one of the first bearing and the second bearing is a ball bearing;
the stator includes a bracket that is attached to an axial end of the shaft;
the first bearing is provided between the axial end of the rotor and the bracket;
the bracket includes a hole that passes through the bracket in the axial direction; and
a connection line connected to the stator extends to an outside of the motor through the hole.

20. The motor according to claim 19, wherein
the tooth groove extends in at least an axial direction; and
an axial end of the tooth groove is separated toward a first axial end of the case from a second axial end of the case.

* * * * *